United States Patent [19]

DeFreitas

[11] Patent Number: 5,499,497
[45] Date of Patent: Mar. 19, 1996

[54] TEMPERATURE DETECTOR AND CONTROL FOR AN IGNITER

[75] Inventor: Dennis M. DeFreitas, Oxford, N.Y.

[73] Assignee: Simmonds Precision Engine Systems, Akron, Ohio

[21] Appl. No.: 103,021

[22] Filed: Aug. 6, 1993

[51] Int. Cl.[6] .................................................. F02C 7/266
[52] U.S. Cl. ............................ 60/39.06; 60/39.821
[58] Field of Search ................. 60/39.821, 39.06, 60/39.822; 431/66, 79

[56] References Cited

U.S. PATENT DOCUMENTS

| | | | |
|---|---|---|---|
| 3,434,788 | 3/1969 | Wright | 431/66 |
| 3,537,804 | 11/1970 | Walbridge | 431/66 |
| 4,198,939 | 4/1980 | Masaki . | |
| 4,345,555 | 8/1982 | Oshima et al. . | |
| 4,414,901 | 11/1983 | Sellwood | 431/79 |
| 4,582,981 | 4/1986 | Brooks et al. . | |
| 4,825,658 | 5/1989 | Beebe . | |
| 4,896,636 | 1/1990 | Pfefferle . | |
| 4,898,531 | 2/1990 | Goldstein et al. | 431/79 |
| 5,146,881 | 9/1992 | Pfefferle . | |

FOREIGN PATENT DOCUMENTS 2356883  3/1978  France ........................... 431/79

OTHER PUBLICATIONS

English translation of French Patent No. 2,356,883.
Abstract for Japanese Patent No. 63100340 Sep. 1988.
Abstract for Japanese Patent No. 1267366 Jan. 1990.
Abstract for Japanese Patent No. 59229059 Dec. 1984.

*Primary Examiner*—Timothy S. Thorpe
*Attorney, Agent, or Firm*—Leonard L. Lewis; William E. Zitelli

[57] ABSTRACT

A temperature sensor for detecting temperature of a heating element of an igniter such as a glow plug includes optic means disposable near the igniter for receiving at least a portion of electromagnetic energy emitted by the heating element and coupling the received electromagnetic energy to a circuit means for producing an output related to the temperature of the igniter in relation to a characteristic of the received electromagnetic energy. In one embodiment, the optic means comprises optic fibers that receive electromagnetic energy emitted by the heating element and couple that energy to a photosensitive detector.

17 Claims, 3 Drawing Sheets

TEMPERATURE DETECTOR AND CONTROL FOR AN IGNITER

BACKGROUND OF THE INVENTION

The invention relates generally to ignition systems such as used with gas turbine engines. More particularly, the invention relates to temperature sensing and control for heated igniters used in such ignition systems.

Known ignition systems use many different types of igniter devices. Some ignition systems use spark type igniters, as are commonly used in the automotive industry. Spark igniters are also commonly used in aerospace applications. However, another type of igniter that is gaining more widespread use in many ignition systems is a glow plug, such as is described, for example, in U.S. Pat. Nos. 4,345,555, 4,582,981 and 4,825,658, the entire disclosures of which are fully incorporated herein by reference. Such devices are heated, such as, for example, by applying electrical energy to electrodes of the plug, to a temperature sufficient to initiate and/or to sustain combustion of a fuel/air mixture exposed to the plug. In some applications, a catalyst is applied to the outer surface of the heated element to further promote the combustion process.

In unthrottled combustion applications, such as, for example, combustion in a gas turbine engine, thermal runaway can occur at the glow plug. Thermal runaway may occur due to the net heat energy dissipated in and around the glow plug during operation. The glow plug is typically heated via electrical energy (existing systems rely on DC or AC currents to attain $I^2R$ heating within the glowing element of the plug). In flow through type combustors prior to the occurrence of ignition the primary mode of heat dissipation for the glow plug is conductive cooling in a turbulent combustible flow. The volume, rate, and dynamic characteristics of this flow mandate that the power required to heat the glow plug to ignition temperatures (i.e. 800° F.–1500° F.) is in excess of the power required to destroy the element during no flow conditions, flow perturbations resulting in the development of catastrophic hot spots or sustained heating once ignition has occurred. If any of the aforementioned conditions occur, failure of the glow plug is eminent unless the heat source for the glow plug can be controlled via a fast stable temperature sensing/control system.

A critical portion of this system is the temperature sensor and signal conditioning system. Typically, the temperature of a glow plug is determined by either welding a thermocouple directly to a portion of the plug surface which will be representative of the plug's maximum surface temperature or by measuring and regulating the electrical current to the plug and assuming thermal stability exists at the plug surface. The first method of temperature measurement exhibits two major problems: A) the temperature sensed is the local temperature at the thermocouple weld site consequently undetectable hot spots can develop; and B) the extreme thermal cycling (i.e., Ambient to 1500 degrees F. per ignition cycle) and extended operation at the elevated temperatures maximize the mechanical fatigue at and around the weld site causing limited life. The primary problem with the second method (measuring and regulating the electrical current) is that the current required to heat the glow plug to ignition temperatures will vary over a wide range due to the cooling characteristics of the turbulent combustible flow discussed earlier. Regulating the current at a preset value will promote premature failure during dynamic operational conditions or require the glow plug and power source to be over designed by several orders of magnitude making them an impractical ignition system solutions.

It is desired, therefore, to detect the temperature of the heated element of the plug. In many applications, precise temperature measurements are not required, but rather only an approximate temperature range is needed.

The objective exists, therefore, for a sensor that can detect temperature of the heated element of an igniter such as a glow plug. The sensor should be capable of providing non-contact multipoint course temperature detection and be able to produce an output that can be used as a control signal for controlling the temperature of the plug, especially through pre-ignition and ignition conditions.

SUMMARY OF THE INVENTION

In response to the aforementioned objectives, the present invention contemplates a temperature sensor for an igniter, which in one embodiment comprises optic means disposable near the igniter for receiving at least a portion of electromagnetic energy emitted by the heating element and coupling the received electromagnetic energy to a circuit means for producing an output related to the temperature of the igniter in relation to a characteristic of the received electromagnetic energy.

According to another aspect of the invention, a temperature control apparatus for an ignition system of the type having an igniter that includes a heating element to cause combustion in an engine comprises sensor means for detecting electromagnetic energy radiated from the heating element, and circuit means for controlling energy delivered to the igniter in response to the detected radiated energy.

The invention further contemplates the methods embodied in the use of such a sensor and apparatus, as well as a method for detecting temperature of an igniter of the type having a heating element used for combustion, comprising the steps of:

a. supplying energy to the igniter to heat the element such that the element emits electromagnetic energy;

b. detecting at least a portion of the emitted electromagnetic energy; and c. converting the detected electromagnetic energy to a signal that corresponds to temperature of the heating element.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
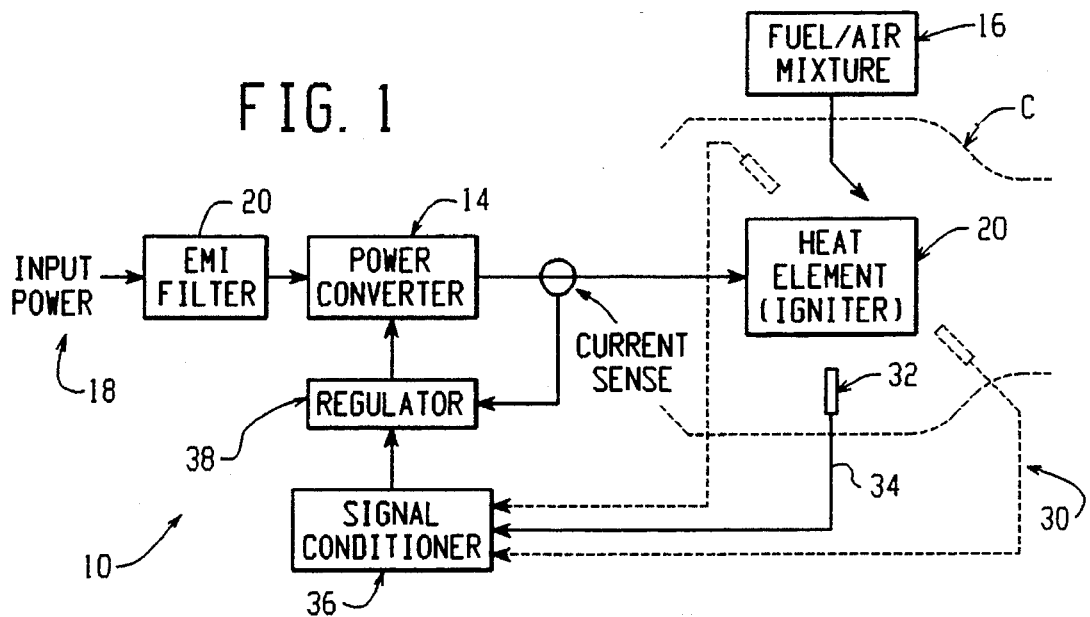
FIG. 1 is a functional block diagram of a temperature detector and control apparatus according to the present invention.

With reference to FIG. 1, a temperature sensing and control apparatus for an igniter is generally represented by the reference numeral 10. Although the invention is described herein with specific reference to detecting and controlling the temperature of a specific type of igniter, in this case a glow plug used in a gas turbine engine, such description should not be construed in a limiting sense. Those skilled in the art will readily appreciate that the invention can be used with many different types of igniters that when in use emit detectable electromagnetic energy as an indication of the operational state of the plug. Although the specific embodiment described herein relates to a heated glow plug of the type that includes an integral electrical (e.g. resistive, inductive or the like) heat element, other types of heated glow plugs can be used. For example, glow plugs that are heated by a heating element that is not integral with the igniter can be used, this being but one example of the choices available Thus, the terms "heat", "heated" and "heating" as used herein in connection with the glow plug are used interchangeably and are intended to include any glow plug of the type that has an igniter element that reaches a sufficient temperature to initiate or facilitate a combustion process, regardless of the manner by which the heat element is heated.

Furthermore, the invention can be used with different engines in different applications. For example, although the embodiment described herein is an unthrottled flow through combustor type turbine engine, the invention can also be conveniently used with throttle-controlled engines and reciprocating engines, to name just two examples. The invention is also not limited per se to ignition or initiation of a combustion process. Rather, the invention also is applicable, for example, to facilitating combustion re-start (such as, for example, after a flame out) or facilitating the combustion process after ignition. Thus, as used herein, the terms "ignition" and "combustion" are intended not as a limitation on the utility of the invention, but rather as a convenient and exemplary reference to engine operating conditions under which temperature control of the igniter is typically desired to prevent thermal runaway or damage.

In FIG. 1, the apparatus 10 is illustrated schematically in combination with an igniter 20 which in this case is an electrically heated glow plug. Such an igniter may include a heat element that is connected to a source of electrical power such as a DC power converter 14, although AC power supplies can also be used if convenient for specific applications. The igniter 20 is typically disposed in or near a combustion chamber C which may be, for example, a turbine engine combustor, preburner, afterburner or other combustion chamber.

An air/fuel mixture is fed to the combustion chamber by an air supply and fuel valve arrangement 16. The combustor and air/fuel supply are illustrated in a simplified schematic manner in FIG. 1 because combustion chambers and in particular turbine engine combustors can be realized in many configurations and designs. A combustor is carefully designed so that the proper air/fuel mix is achieved to maximize efficient burning of the fuel. As represented in FIG. 1, the air/fuel mixture is also provided to the combustion chamber C so that ignition thereof by the igniter may occur when the heat element reaches a sufficient temperature. The igniter may also be used after ignition for sustaining combustion and for re-ignition.

The power converter 14 is connected to an input power source which in this case can be a DC voltage supply. Typically, such DC supplies are filtered such as with an EMI filter 20 as is well known in the art.

In accordance with the invention, a temperature detector 30 for the igniter makes use of the fact that the igniter, in this case a glow plug, emits electromagnetic radiation when heated. In many cases the glow plug emits visible light when heated near the temperature required for combustion. Other plugs may emit infrared radiation near the temperatures of interest, or radiation in other spectral bands. In the embodiment described herein, the invention utilizes the intensity characteristic of the emitted radiation to approximate the igniter temperature. In other words, the intensity of the emitted radiation increases as the igniter gets hotter. By detecting this intensity, the temperature detector can be used as a threshold temperature detector to prevent thermal runaway at the igniter. It is understood that characteristics other than intensity, such as for example wavelength, may be used for detecting temperature of the igniter.

The temperature detector 30 of the invention in this example includes an optical sensor 32 disposed in an area whereby at least a portion of the electromagnetic radiation emitted from the igniter is received by the sensor 32. The received radiation is coupled by an optic fiber cable 34, for example, to a signal conditioning circuit 36. In the described embodiment, the signal conditioning circuit includes a means for converting the electromagnetic energy collected by the sensor 32 into an electrical signal that corresponds to the intensity of the emitted radiation and thus to the temperature of the igniter, and more specifically the heating element of the igniter.

The signal conditioning circuit 36 produces an output that is used to control a regulator circuit 38 for the power converter 14. As shown in FIG. 1, a current sensor can be used to detect current through the igniter. This detected current provides a convenient means for monitoring and regulating maximum power to the igniter. The regulator circuit 38 and the converter 14 can be conventional circuit designs well known to those skilled in the art, therefore, a detailed description of these circuits is not required for purposes of this description. It should be noted, however, that the signal conditioning circuit can be used in different ways depending on the particular application selected by the designer. For example, the conditioning circuit 36 can be used to completely interrupt power from the converter 14 to the igniter 20 when the igniter temperature exceeds a selected threshold. In such a case, the regulator 38 can include a simple electronic switch that disables the converter 14 when the conditioning circuit output indicates the igniter temperature threshold has been exceeded. As another example, the conditioning circuit can be used to reduce power from the converter 14 to the igniter in cases when operation of the igniter is desired but at a reduced input power level due to the combustion temperature. As still a further example, the temperature sensor can be used in combination with the current sensor to control temperature of the igniter within desired operating conditions of the application. Other temperature control arrangements can of course be used as will be apparent to those skilled in the art.

Figure 2A:
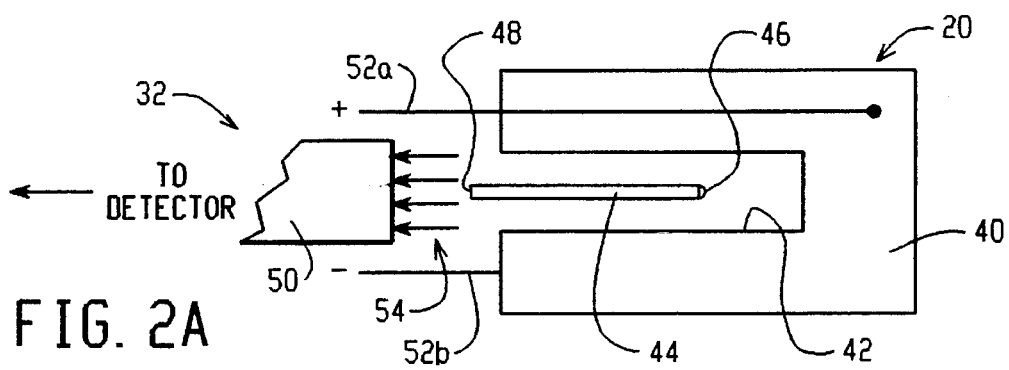
FIGS. 2A, 2B and 2C are schematic representations in simplified form for clarity of different embodiments of an optical temperature sensor according to the present invention and suitable for use with the apparatus shown in FIG. 1.
Figure 2B:
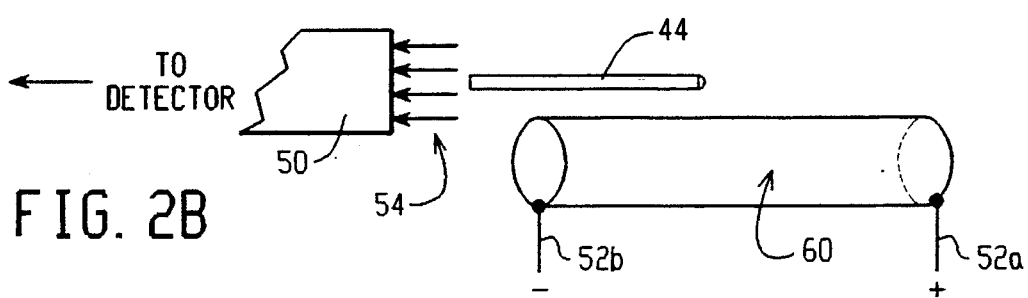
Figure 2C:
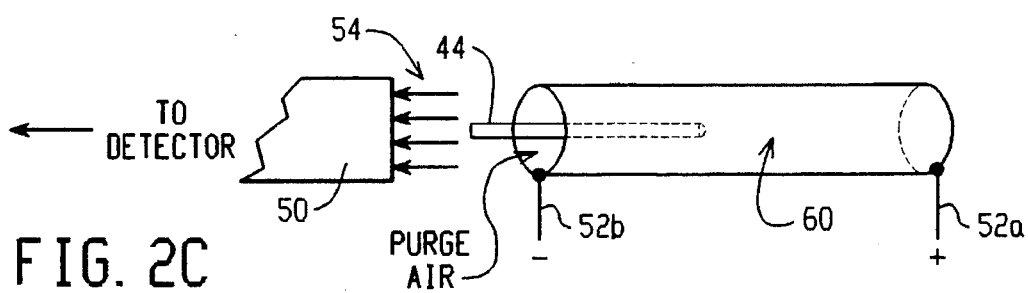

With reference next to FIGS. 2A–2C, three exemplary embodiments of heat elements of the igniter 20 are shown in combination with different arrangements of the optical sensor 32 that forms part of the temperature sensor 30. Other configurations will be readily apparent to those skilled in the art so that the exemplary embodiments should not be construed in a limiting sense. These embodiments are shown in a simplified manner for clarity and understanding of the teachings of the invention. In FIGS. 2A–2C like reference numerals are used for corresponding components of the different embodiments.

In FIG. 2A, the igniter 20 heat element includes a cylinder slug 40 with a hollowed core to form a bore 42. The slug 40 can be made of a suitable material such as metallized ceramic, for example, to function as a heat element for the igniter 20. The sensor 32 in this case is realized in the form of a light conduit or rod 44 that has one end 46 disposed inside the bore 42. The inner end 46 may include a lens, or be formed in the shape of a lens to focus emitted radiation into the light rod and other optic elements of the sensor. The other end 48 of the light rod 44 is optically coupled to a fiber optic cable 50 which can include one or more optic fibers to couple the received radiation to a detector in the signal conditioning circuit 36.

Electrical energy is supplied to the igniter from the converter 14 via electrical leads 52a and 52b which are coupled respectively to opposite ends of the slug 40. The hot igniter causes the air/fuel mixture which comes in contact with it to ignite. In the case of a catalytic plug, the outer surface of the slug 40 can be coated or otherwise provided with a suitable catalyst to further promote combustion.

As the igniter heats up, it emits radiation that enters the rod 44 and passes through to the optic fiber cable 50 as represented by the arrows 54. The light rod 44 can be coupled to the optic fiber cable 50 by an optic coupler or other suitable means well known to those skilled in the art. Alternatively, the fiber cable and light rod can be an integral assembly if desired.

The light rod 44 can be, for example, a sapphire rod, and the optic fibers can also be made of sapphire for temperature protection of the sensor. Other materials such as quartz for example could also be used depending on the operating parameters, such as temperature, of the particular application.

In FIG. 2B, the igniter 20 includes a hollow tube 60. In this case, the light rod 44 is disposed near or adjacent the igniter tube 60 and can receive radiation emitted from the heated tube 60. In FIG. 2C, the light rod 44 is disposed in the tube 60 so that high pressure purging air can be delivered through the tube to help keep the rod clean from combustion by-products in cases where non-clean burning fuels are used. The use of clean fuels such as methane, propane and natural gas may obviate the need for purge air.

In the exemplary embodiments of FIGS. 2A–2C, only one rod/fiber type sensor 32 is shown in use with the heat element of the igniter 20. This is for clarity only. Additional sensors 32 can be disposed about the heat element (as shown in phantom in FIG. 1, for example) if advantageous for a particular application. The use of a plurality of sensors 32 may be desirable, for example, with large diameter glow plugs. As another example, multiple sensors increase the likelihood of detecting hot spots (caused for example by the high turbulence flow through the combustor) that a single sensor might miss but that could otherwise lead to thermal runaway at the igniter. Three sensors spaced about the igniter should be suitable for many applications, but the actual number used will depend on the actual operating characteristics of the specific combustion chamber. The signal conditioning circuit 36 can easily be modified (not shown) to detect and process the optical signals from the various sensors, as will be apparent to those skilled in the art. The sensor outputs could be individually monitored or averaged together, for example.

Figure 3:
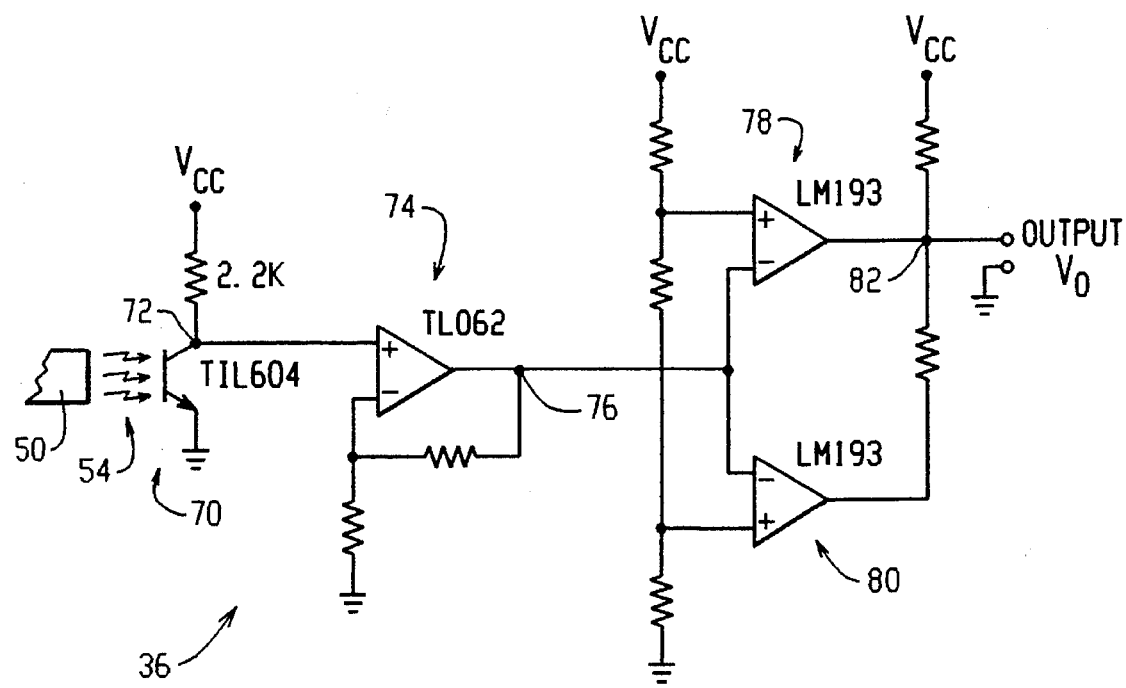
FIG. 3 is a detailed electrical schematic of a signal conditioning circuit suitable for use with the present invention.

With reference next to FIG. 3, an embodiment of a signal conditioning circuit suitable for use with the invention is shown schematically. The output end of the optic fiber cable 50 is disposed so that the electromagnetic energy from the igniter impinges on a detector 70, which in this case is a phototransistor that converts the electromagnetic energy to an electrical signal such as a photocurrent. The collector current is proportional to the intensity of the electromagnetic energy incident on the phototransistor, and produces a collector voltage at a collector node 72 that is connected to a non-inverting input of an operational amplifier configured as a conventional voltage amplifier 74. The amplified signal at the output 76 is input to a pair of voltage comparators 78,80 configured as level detectors. The outputs of the level detectors 78,80 are wired-OR together to produce an output signal at an output node 82. In this case, the output signal ($V_{out}$) at the output node 82 is a multi-level output signal. For the circuit of FIG. 3, the output signal has three output states or levels that correspond to controlling three power output levels of the converter 14. These three output states can be used to coarsely regulate the glowing element temperature of the igniter within the required ignition regime. One output state corresponds to $V_{out}=V_{cc}$, and this state exists when the emission of the electromagnetic energy is minimal, such as can exist during system start-up. During this state, full power is supplied to the glow plug for rapid heating and minimum ignition times. The second logic state ($V_{out}=X/V_{cc}$ where X represents the voltage divider network formed by the resistor connected to the output of the detector 80 and the resistor connected to $V_{cc}$ and the output node 82) exists when the emission of electromagnetic energy is representative of the desired ignition temperature of the glowing element within the glow plug. In anticipation of ignition the power level to the glow plug is reduced to a level required to sustain this ignition temperature. The third logic state ($V_{out}=$approximately 0 volts or logical 0) exists when the emission of electromagnetic energy is above levels required for ignition. During this state, power to the glow plug is removed in an attempt to prevent glow plug failure.

Thus, the output of the circuit 36 can be used to control operation of the power delivered to the igniter as a function of the temperature of the igniter heat element. Alternatively, of course, the analog amplified signal from the amplifier 74 could be used for analog control of the energy delivered to the igniter if desired.

Figure 4:
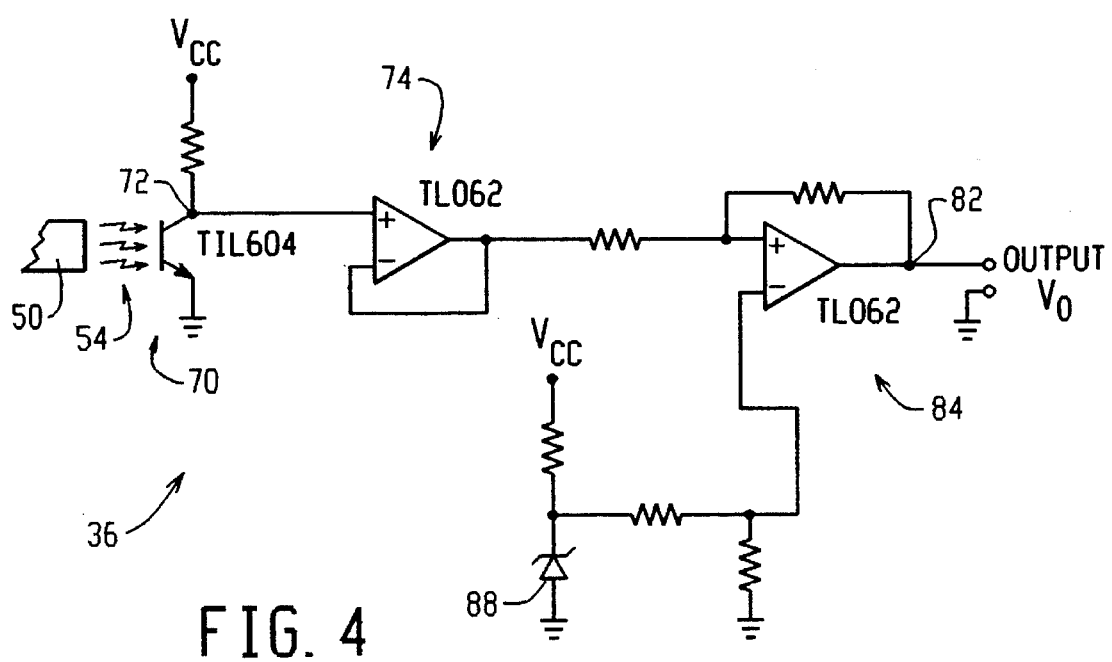
FIG. 4 is another embodiment of a signal conditioning circuit suitable for use with the present invention.

With reference to FIG. 4, another embodiment of the signal conditioning circuit 36 is illustrated schematically. In this example, the output signal at the node 72 (corresponding to the intensity of the radiation incident on the photocell 70) is fed to an amplifier 74 similar to the embodiment of FIG. 3. The amplified signal, however, is coupled to the inverting input of an operational amplifier configured as a differential amplifier 84. The output signal from the amplifier will be proportional to the electromagnetic energy incident on the phototransistor. During start-up the output voltage at 82 will be slightly below the amplifier supply voltage $V_{cc}$, and this will correspond to maximum power to the glow plug. As the electromagnetic emissions of the element in the glow plug increase the output of the amplifier will decrease, thereby causing the power to the element to be reduced and maintaining an average ignition at the glow plug within the temperature band mentioned earlier. A zener diode 88 can be used in a conventional manner to establish the reference level for the differential amplifier.

Those skilled in the art will readily appreciate that the circuits of FIGS. 3 and 4 are but two examples of control circuits that can be used with the invention. Depending on the particular application, other control systems could be used. For example, the output of the signal conditioning electronics can also be input to a microprocessor, microcontroller, digital signal processor or any other computer based control technology for the purpose of predicting glow plug surface temperatures and regulating the energy required to maintain the glow plug at ignition temperatures. The combination of electrical current measurement (as with the current sensor shown schematically in FIG. 1) to the glow plug with electromagnetic energy emissions from the plug will increase the accuracy for the temperature control function.

Figure 5:
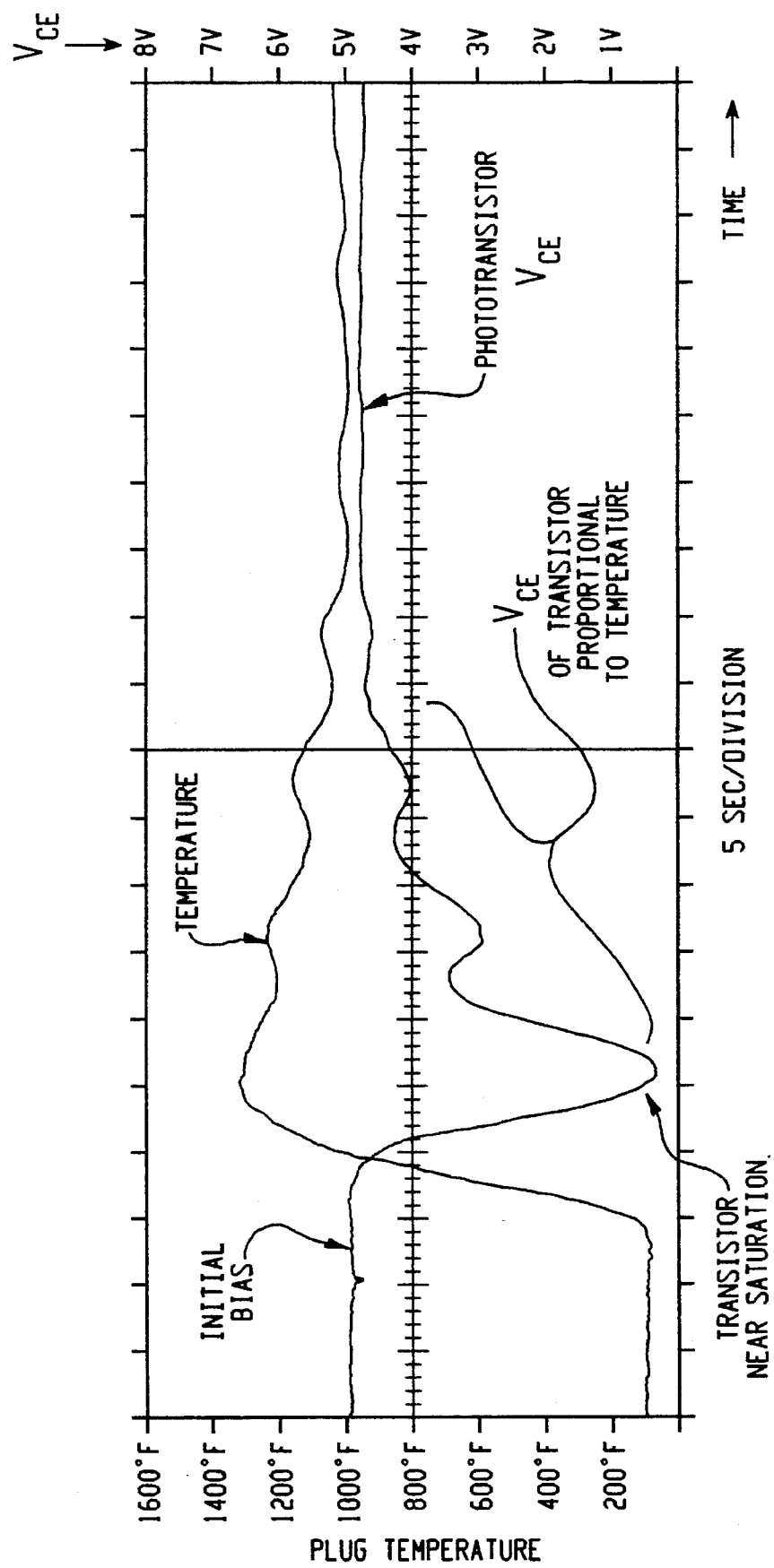
FIG. 5 is a representative graph of a typical temperature vs. electromagnetic emissions profile for a glow plug type element configured similar to the embodiment in FIG. 2C.

FIG. 5 depicts a typical temperature vs. electromagnetic emissions profile for a glow plug type element configured as in FIG. 2C (using an optic fiber sensor without the sapphire rod) heated by an AC power source. The temperature data was measured by a thermocouple welded to the heat element while the electromagnetic emissions were measured as the collector to emitter voltage drop of the phototransistor such as shown in FIGS. 3 and 4. The graph shows that the output of the phototransistor can be configured to provide a variety of course temperature measurement solutions (typically ±25° F.) by operating the phototransistor in either the "linear region" or into the "saturation region." The actual components and biasing requirements will be dependent on the particular application as is well known to those skilled in the art.

The invention thus provides a simple and convenient temperature detector and control apparatus for ignition systems of the type that use igniters such as glow plugs and the like for causing combustion of an air/fuel mixture. The use of optics for the temperature sensor permits close proximity of the sensor to the igniter if desired without adverse temperature effects such as render thermocouples and other mechanical connections impractical within a combustion chamber. The invention further achieves multipoint temperature sensing for an igniter whereas conventional devices such as thermocouples provide single point temperature sensing.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A temperature detector apparatus comprising: a compressed high volume air flow through combustor; an igniter exposed to the path of an air/fuel mixture to the combustor; the igniter being heated by electrical energy in the presence of said high volume air flow to ignite the air/fuel mixture; and a temperature sensor comprising optic means disposed with respect to the igniter such that a portion of electromagnetic energy radiated from the igniter enters said optic means; and circuit means for converting said portion of electromagnetic energy to an output representative of the igniter temperature, said circuit means comprising control means for regulating said electrical energy delivered to the igniter as a function of said output to maintain the igniter substantially at a predetermined temperature through ignition of the air/fuel mixture.

2. The combination of claim 1 wherein the igniter comprises a catalytic igniter.

3. The combination of claim 1 wherein the igniter comprises an igniter used for initiating combustion in a gas turbine engine.

4. The combination of claim 3 wherein said engine is a jet engine for aircraft.

5. The combination of claim 1 wherein the igniter comprises a glow plug.

6. The combination of claim 1 wherein said control means continues to regulate electrical energy delivered to the igniter after ignition.

7. The combination of claim 1 wherein said optic means comprises optic fiber means disposed with one end near the heating element of the igniter such that said portion of radiated electromagnetic energy from the heating element enters said optic fiber means.

8. The combination of claim 7 wherein said optic fiber means comprises a rod that transmits electromagnetic energy, a first end of said rod being disposed near the igniter to collect radiation from the heating element, and a second end of said rod being optically coupled to an optic fiber bundle.

9. The combination of claim 8 wherein said optic fiber means transmits radiation collected by said rod and couples it to a transducer means for converting said radiation to a transducer output that corresponds to the intensity of the radiation.

10. The combination of claim 9 wherein said control means interrupts power to the igniter when said transducer output reaches a predetermined threshold level.

11. The combination of claim 1 wherein said output is used as an igniter temperature control for an ignition system in a gas turbine engine.

12. The combination of claim 1 wherein said control means comprises means for detecting current flow to the igniter and adjusting current to the igniter in response to said circuit means output and said detected current.

13. The combination of claim 12 wherein said control means comprises a digital processing circuit.

14. A method for controlling temperature of an igniter of the type having a heating element used for combustion, comprising the steps of:

a. disposing the igniter in the path of an air/fuel mixture to a compressed high volume air flow through combustor;

b. supplying electrical energy to the igniter to heat the igniter in the presence of the high volume air flow to ignite the air/fuel mixture;

c. detecting optically at least a portion of electromagnetic energy emitted by the heated igniter;

d. converting the detected electromagnetic energy to a signal that represents temperature of the igniter; and e. regulating electrical energy to the igniter in response to said signal to maintain the igniter substantially at a predetermined temperature through ignition of the air/fuel mixture.

15. The method of claim 14 wherein the step of detecting at least a portion of the emitted electromagnetic energy comprises the steps of using an optic fiber to transmit electromagnetic energy emitted by the heating element to a photosensitive detector.

16. The method of claim 15 wherein the step of converting the electromagnetic energy comprises the step of using the photosensitive detector to produce an electrical signal that corresponds to the intensity of the electromagnetic energy incident thereon.

17. The method of claim 14 further comprising the step of using said signal and regulating energy delivered to the igniter to control the temperature of the igniter after ignition.

* * * * *